United States Patent [19]

Gleasman

[11] Patent Number: 4,495,835
[45] Date of Patent: Jan. 29, 1985

[54] DIFFERENTIAL GEARING ASSEMBLY

[75] Inventor: Vernon E. Gleasman, Cleveland Heights, Ohio

[73] Assignee: The Gleason Works, Rochester, N.Y.

[21] Appl. No.: 475,526

[22] Filed: Mar. 15, 1983

[51] Int. Cl.³ .................. F16H 1/38; F16H 1/42; F16H 57/02
[52] U.S. Cl. ........................ 74/715; 74/714; 74/607
[58] Field of Search .................. 74/710, 710.5, 711, 74/713, 714, 715, 607; 29/434

[56] References Cited

U.S. PATENT DOCUMENTS

| | | | |
|---|---|---|---|
| 1,874,646 | 8/1932 | Skinner | 74/713 X |
| 2,070,569 | 2/1937 | Asam | 74/715 |
| 2,203,683 | 6/1940 | Frederickson | 74/715 |
| 2,720,796 | 10/1955 | Schou | 74/711 |
| 2,855,805 | 10/1958 | Fallon | 74/711 |
| 2,859,641 | 11/1958 | Gleasman | 74/715 |
| 2,898,779 | 8/1959 | Mickelson | 74/711 |
| 2,972,265 | 2/1961 | Walter | 74/714 X |
| 3,008,350 | 11/1961 | Misener | 74/710.5 |
| 3,237,483 | 3/1966 | Kelley et al. | 74/715 |
| 3,375,736 | 4/1968 | Saari | 74/711 |
| 3,400,611 | 5/1966 | Engle | 74/710.5 |
| 3,494,226 | 10/1970 | Biddle | 74/711 |
| 3,527,120 | 9/1970 | Duer et al. | 74/711 |
| 3,706,239 | 12/1972 | Myers | 74/715 |
| 3,735,647 | 5/1973 | Gleasman | 74/715 |
| 3,849,862 | 11/1974 | Benjamin | 74/715 X |
| 3,874,250 | 4/1975 | Duer et al. | 74/711 |
| 3,875,824 | 4/1975 | Benjamin | 74/715 |
| 3,884,096 | 5/1975 | Gleasman | 74/715 |
| 3,893,351 | 7/1975 | Baremor | 74/710.5 |
| 3,902,237 | 9/1975 | Benjamin | 74/715 |
| 4,162,637 | 7/1979 | Altmann | 74/711 |
| 4,191,071 | 3/1980 | Gleasman et al. | 74/715 X |
| 4,245,525 | 1/1981 | LeBegue | 74/711 |
| 4,269,086 | 5/1981 | Altmann | 74/710.5 X |
| 4,365,524 | 12/1982 | Dissett et al. | 74/715 |

Primary Examiner—Allan D. Hermann
Assistant Examiner—Stephen B. Andrews
Attorney, Agent, or Firm—Ralph E. Harper; Morton A. Polster

[57] ABSTRACT

A differential gearing assembly including a differential case 10 that mounts axle drive gears 22 rotatably engaged with axles 20 and transfer gearing 50 for cross coupling the axle drive gears. The axle ends are secured to the differential assembly by lock rings 32 received by lock ring grooves formed on the axle ends. A thrust spacer maintains the predetermined spaced apart position of the axle ends and in one embodiment 26 comprises elements 26a 26b which when joined together by a fastener 28 capture the lock rings in their installed positions on the axle ends. The transfer gearing includes transfer gears 50 rotatably coupled to each other by intermediate gearing 54. In an alternate embodiment, a thrust spacer 70 is bisected along a line defined by stepped confronting surfaces 74a, 74b, 74c to define interfitting halves 72a, 72b. Each half is configured and sized to facilitate removal through an opening defined between the intermediate gears. The inclination angles of the teeth on the axle drive gears 22 are equal but opposed so that equal and opposed thrust forces are exerted on the differential case.

7 Claims, 5 Drawing Figures

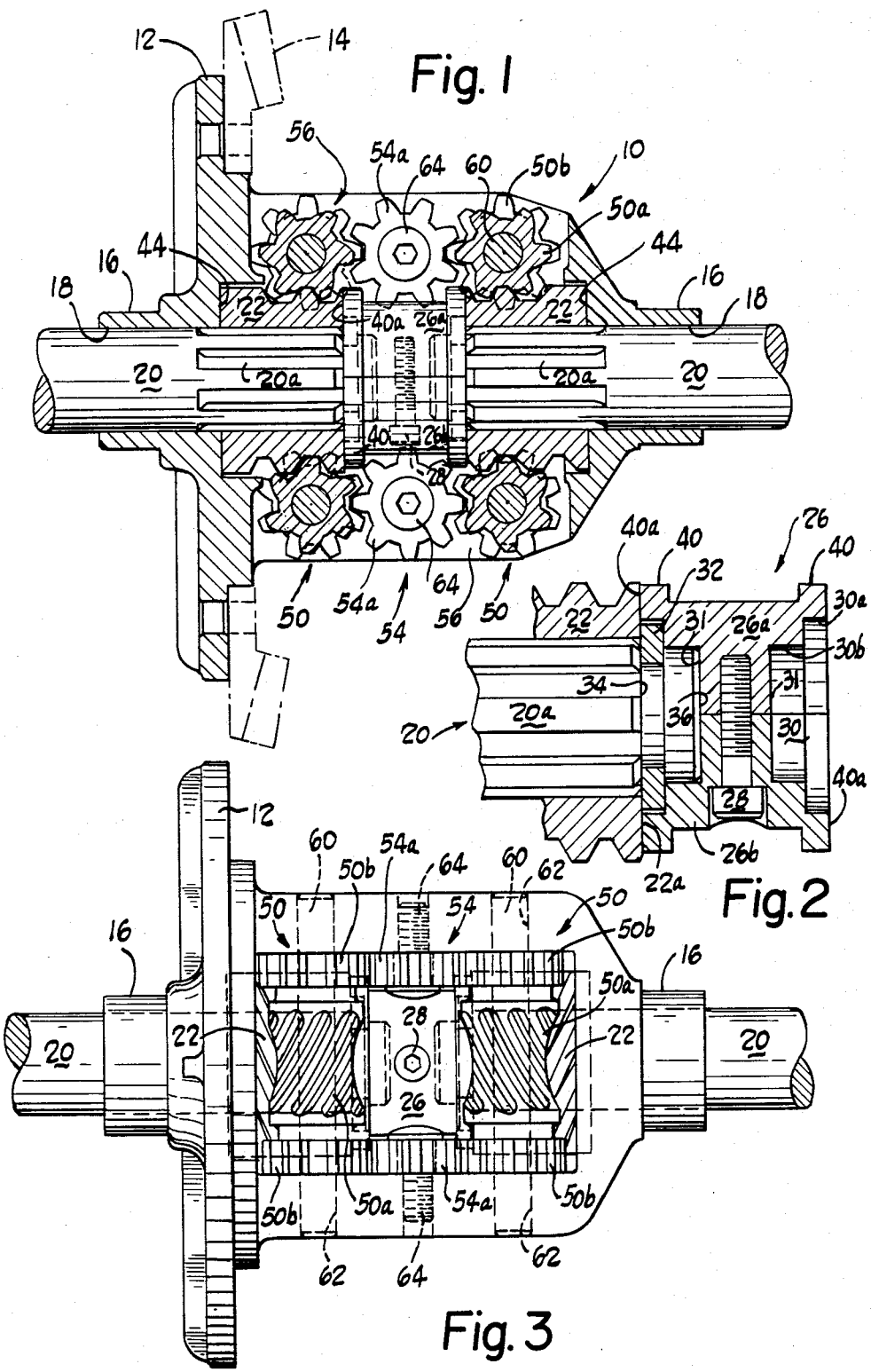

DIFFERENTIAL GEARING ASSEMBLY

CROSS REFERENCES TO RELATED APPLICATIONS

Application of Vernon E. Gleasman and Keith E. Gleasman, Ser. No. 475,525, entitled Differential Gear Apparatus, filed concurrently herewith, the disclosure of which is hereby incorporated by reference.

Application of Vernon E. Gleasman, Ser. No. 475,528, entitled Differential Apparatus and Method for Making, filed concurrently herewith, the disclosure of which is hereby incorporated by reference.

Application of Gene A. Stritzel, Ser. No. 475,527, entitled Improved Differential Apparatus and Method of Making, filed concurrently herewith, the disclosure of which is hereby incorporated by reference.

TECHNICAL FIELD

The present invention relates generally to drive axle assemblies and in particular to an improved differential gear assembly and to a method and apparatus for interlocking axle shafts with the differential gear assembly.

BACKGROUND ART

A drive axle assembly for a rear wheel drive vehicle, for example, typically includes an axle housing, a pair of axles for driving wheels located at the outer ends of the housing, and a differential gear arrangement mounted centrally in the housing for driving the axles. The inner ends of the axles are typically splined to drive gears in the differential gear assembly, whereas the outer ends are rotatably supported by wheel bearings located at the ends of the axle housing. Until recently the wheel bearings were usually press-fitted onto the axles and bearing retainer plates mounted at the extreme outer ends of the housing clamped the bearings to the housing and hence secured the axles in position.

At least one automobile manufacturer has departed from this traditional rear axle configuration and presently uses locking elements within the differential assembly itself to maintain the axles within the axle housing instead of axle retainer plates mounted at the ends of the housing. In the rear axle assemblies currently employing internal locking elements for retaining the axles, the differential gearing mounted within the axle housing is a conventional bevel gear differential. As is conventional in this type of differential, a ring gear rotates a differential case which mounts four interengaged bevel gears that rotate about two mutually orthogonal axes. One axis is defined by the axles to which two of the bevel gears are drivingly coupled. Generally these "axle drive" gears include splined bores that engage mating splines formed on the axle ends; this one axis is normally coincident with the rotational axis of the ring gear. The remaining two bevel gears are generally termed "spider" gears. These gears rotate on a common axis usually defined by a common shaft mounted in the case and intersecting the first axis at 90°. The spiders "differentiate" torque between the axle drive gears.

Each axle drive gear includes an annular recess adjacent and coaxial with the splined bore. Because the recess is larger than the bore, a shoulder is defined therebetween. The end of each axle includes a groove for receiving a locking "C-ring". To couple the axles to the axle assembly, each axle is first inserted, inner end first, from the respective outer ends of the housing, through the associated axle gears, until the locking grooves extend beyond the associated drive gears. C-rings are then inserted into the grooves and the axles moved outwardly so that the C-rings enter the recesses formed in the axle drive gears. The recesses are sized to prevent displacement of the C-rings from the axle ends.

The shaft for the spider gears, when positioned, extends between the axle ends and intersects the axis of the axles. By critically sizing the diameter of the shaft as well as the distance between the locking groove and end face on each axle end, the shaft in effect maintains the assembled position of the axles and further provides a thrust surface for the axles.

The installation of a differential mechanism, other than a bevel gear differential, in an axle housing employing this type of arrangement for retaining the axles within the housing presents some difficulty, if the differential to be installed does not include a shaft or a pin disposed along a line that intersects the axis of the axles. In addition, in the case of a bevel gear differential, alternate arrangements for maintaining the spatial position of the axle ends may be desirable since, as presently configured, release of the axle ends requires removal of a shaft retaining fastener before the shaft itself can be removed. As explained above, the shaft also serves as a thrust receiving member for the axle ends. Since the shaft is cylindrical, the thrust forces from the axle ends are transmitted to the shaft along a single line of contact. It would appear that distributing end thrust forces along a larger area would be desirable.

U.S. Pat. No. 2,859,641 to Gleasman, which is hereby incorporated by reference, discloses a differential mechanism, termed a "Cross-Axis Compound Planetary Gear Complex". The differential disclosed in the Gleasman patent includes worm gears rotatably coupled to each axle and balancing gear complexes rotatably supported by the differential case for transferring and splitting torque between the axle gears. The gear complexes are mounted in pairs and each complex rotates on an axis of rotation that is substantially tangential to the pitch of its associated axle gear. In the differential mechanism disclosed in this Gleasman patent, the axle gears include inner end faces positioned in confronting alignment with a thrust bearing intermediate the faces. It is considered unfeasible to provide a shaft between the axle drive gears to act as a thrust and locating surface for the ends of the axles. Nevertheless, it has been considered desirable to mount a cross-axis compound planetary gear type of differential in an axle housing of the type described above.

The differential illustrated in the Gleasman patent included axle drive gears having parallel tooth inclination angles. As a result, during differential operation the end thrust loading exerted by the individual side gears was additive producing about twice the normal side loading on one axle gear. It was found that under certain conditions unequal torque was delivered to the axles. U.S. Pat. No. 4,191,071 to Gleasman et al which is also hereby incorporated by reference discloses a torque equalizer arrangement for obviating the effects of the additive end thrust loading. The disclosed apparatus includes a supplemental bearing disposed between the differential case and the end thrust loaded side gear. It has been found desirable to, if possible, eliminate the need for supplemental torque equalizing components.

DISCLOSURE OF THE INVENTION

The present invention provides a new and improved differential assembly that includes an internal axle locking arrangement for retaining the ends of the axles. In addition, transfer gearing for splitting torque between the axles is disclosed that operates to impose equal, but opposite, end thrust to axle drive gears rotatably coupled to the axle shafts during differential operation.

According to one embodiment of the invention, the assembly comprises a differential case which mounts the various components. Axle drive gears, also termed side or traction gears, are mounted at opposite sides of the case and in alignment with bores through which the axle ends extend to engage the gears. The ends of the axle are secured to the differential assembly by locking elements that are received by cooperating structure formed on the axle ends. In the preferred embodiment, the structure comprises an annular groove formed near the end of the axle and the element comprises a locking C-ring engaged by the groove.

According to one feature of the invention, a thrust member is disposed between the axle ends and side gears. The preferred thrust member serves a multitude of functions in that it defines thrust surfaces for the side gears as well as thrust surfaces for the axle ends. In addition, internal shoulders are defined at opposite ends of the member which are sized to fit around the ends of the axle and lock rings to capture the lock rings in their interlocked position. In the preferred and illustrated embodiment, the thrust member is bisected, the individual halves of the member being secured by suitable threaded members such as screws. With the disclosed construction, the axles are released from the differential assembly by removing the thrust member fasteners to separate and remove the individual halves of the thrust member. Once removed, the axle lock rings can then be removed to enable withdrawal of the axle shafts from the differential.

In one embodiment, the thrust member is split along a diametral line. In another embodiment, the thrust member includes recesses which receive the extreme ends of the axles only and not the lock rings. In this alternate embodiment, the lock rings are received by recesses in the side gears. In addition, the thrust member is bisected to form two interfitting halves defined by off-set surfaces. Each half is dimensioned so that its removal from inside the differential can be effected with minimal disassembly.

According to another feature of the invention, transfer gearing is carried by the differential case that is operative to "differentiate" or split driving torque between the axle drive gears. The disclosed arrangement also equalizes axle gear end thrust so that equal and opposed thrust forces are exerted on the differential case and/or axles by the axle drive gears.

In particular, the transfer gear arrangement includes an individual transfer gear associated with each axle drive gear. Each transfer gear defines a side gear engaging portion and a balancing gear portion. The individual transfer gears are arranged in pairs so that a transfer gear associated with one side gear is paired with a transfer gear associated with the other side gear. In the disclosed embodiment, the transfer gear pairs are mounted in an opening or window defined by the differential case. According to the invention, the paired transfer gears are rotatably coupled by intermediate gearing also mounted within the window.

In one embodiment, an intermediate gearing mounted within the differential case window is arranged to define a clearance space between the gear components through which the thrust member can be installed and removed. In this embodiment, the installation or release of the axles from the differential does not necessitate disassembly of the differential itself.

In the disclosed embodiment, the side gear engaging portion of the transfer gear comprises an irreversible gear such as a worm wheel and the balancing gear portion comprises a pair of reversible gears, such as spur gears disposed at opposite ends of the worm wheel. Paired transfer gears, mounted within the window, rotate on parallel axes, such that the worm wheel portions are tangent to the pitch of the respective side gears.

The intermediate gearing comprises reversible idler gears, i.e. spur gears, rotatably supported within the window and located intermediate adjacent spur gear portions of the transfer gears. Thus each spur gear of a transfer gear is rotatably coupled through an associated idler gear to the spur gear portion of the adjacent transfer gear. In the preferred embodiment, the clearance space through which the thrust member is installed and/or removed is defined between adjacent worm wheel portions of the transfer gears and the idler gears.

With the preferred embodiment, the installation and/or release of the axles from the differential assembly is easily accomplished without the need for excessive disassembly of the differential components. In fact, in the preferred embodiment, the thrust member which serves to maintain the position of the side gears, axle ends and axle locking rings can be removed through the clearance opening defined between the transfer gearing and hence disassembly of the differential itself is totally obviated.

In addition, when the side gears and side gear engaging portions of the transfer gears are formed as helical gears, by inclining the teeth of the side gears at opposite angles, equal but opposed end thrust forces are exerted by the side gears during differential operation. As a result, during normal operation, equal torque is delivered to the axles without the need for supplemental differential components to compensate for unbalanced end thrust on the side gears and/or axles.

In an alternate embodiment, additional clearance for removing the thrust member is provided by removing the idler gears and/or one or more transfer gears. In this embodiment, the idler spur gears may be mounted individually within the window by separately removable fasteners or alternately may be mounted via a common shaft that extends across the opening. Removal of the idler gears is achieved by removing the shaft. Similarly, the transfer gears are released by removal of their associated shafts.

Additional features will become apparent and a fuller understanding of the invention obtained by reading the following detailed description made in connection with the accompanying drawings.

BRIEF DESCRIPTION OF DRAWINGS

FIG. 1 is a sectional view of a differential assembly constructed in accordance of the preferred embodiment of the invention;

FIG. 2 is an enlarged fragmentary view of the differential with certain parts removed to illustrate a spacer arrangement constructed in accordance with the preferred embodiment of the invention;

FIG. 3 is an elevatonal view of the differential assembly, rotated 90° from the position shown in FIG. 1;

DETAILED DESCRIPTION OF A PREFERRED EMBODIMENT OF THE INVENTION

Figure 4:
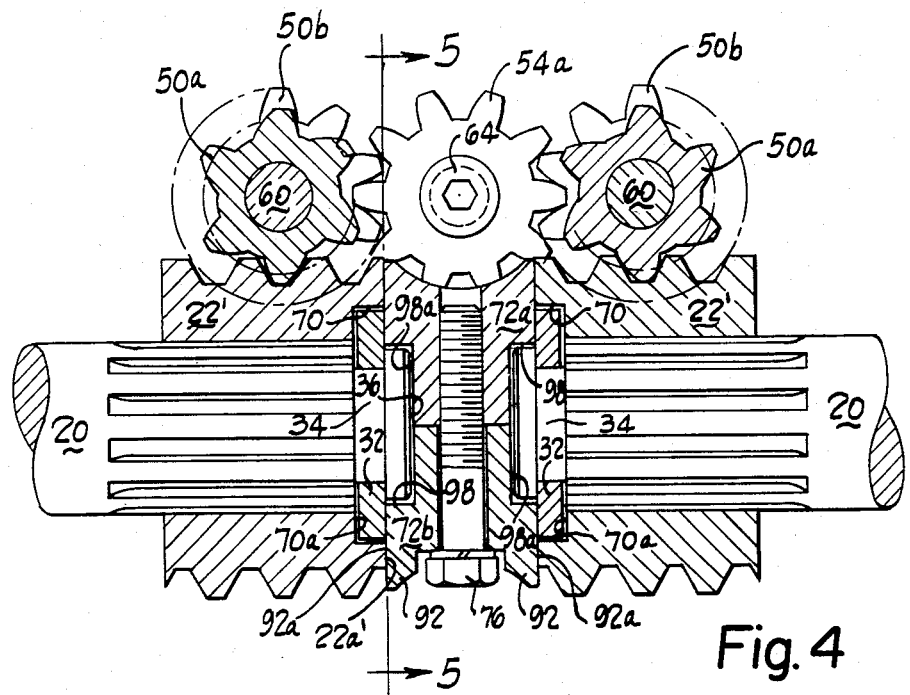
FIG. 4 is an enlarged, fragmentary view, partially in section, of an alternate embodiment of an axle spacing and thrust member constructed in accordance with the preferred embodiment of the invention; and, FIG. 5 is an enlarged, fragmentary view of the member as seen from the plane indicated by the line 5—5 in FIG. 4.

FIG. 1 illustrates the construction of a differential assembly embodying features of the present invention. Referring also to FIG. 3, the differential assembly includes a differential case 10 that defines a flange 12 to which a ring gear (shown in phantom) 14 is suitably attached and a pair of spaced-apart trunnions 16 are adapted to receive bearings (not shown) by which the differential case is rotatably mounted inside a differential or axle housing (not shown).

The housing 10 also defines axle receiving bores 18 which are at least partially defined by the trunnions 16 through which axle ends 20 extend into engagement with internal differential components. In particular, in the illustrated embodiment each axle end includes external splines 20a which engage mating, internal splines defined by respective axle drive gears 22 which are located inside the differential case 10.

In accordance with one feature of the invention, a multi-function spacer is utilized to secure the axle ends to the differential and in addition to provide thrust surfaces for the axle ends 20 and the axle drive gears 22. In the embodiment illustrated in FIGS. 1 and 2, the spacer comprises a split element 26, including elemental parts 26a, 26b held together by a fastener 28 that extends through a bore formed in the element 26b and into threaded engagement with the element 26a. As seen best in FIG. 2, when the elements 26a, 26b are joined, they define a pair of spaced apart multi-stepped recesses 30 on opposite sides of the spacer having large and small diameter portions 30a, 30b, respectively.

In the illustrated embodiment, the axles are retained in the differential case by removable locking elements which in the preferred embodiment comprise C-rings 32 which are received by C-ring grooves 34 formed near the extreme, inner ends of the axles 20. As seen best in FIGS. 1 and 2, when the C-rings 32 are installed in the C-ring grooves 34. Upper radial side portions of the C-rings abuttingly engage portions of side surfaces 22a of the axle drive gears 22 and thus prevent the outward movement of the axle ends.

With the arrangement shown in FIGS. 1, 2, and 3, the C-rings 32 are maintained in position by the spacer 26. As seen best in FIG. 2, when the two halves 26a, 26b of the spacer 26 are positioned inside the differential and are clamped together, the larger diameter portion 30a of the recess 30 defined by the spacer 26 receives the lock rings 32 located at the ends of the axles, thus capturing the lock rings and preventing their dislodgement or displacement from the positions shown in FIG. 1.

Although not shown, the invention also contemplates locking elements formed integral with split spacer 26. Each spacer half, 26a and 26b, may include an internal flange directly engageable with groove 34.

The smaller diameter portion 30b of a recess 30 receives the extreme end of an associated axle end 20. The depth of the recess 30b is selected such that an end wall 31 of each recess 30 provides a thrust surface for a respective end face 36 of each axle and thus limits the inward movement of the axle ends 20.

In addition, the spacer 26 also defines spaced-apart flanges 40 which include side surfaces 40a that confrontingly engage portions of the side surfaces 22a of the axle drive gears 22. It will be appreciated that by suitable selection of the transverse dimension (or axial length) of the spacer, locating and thrust surfaces (the surfaces 40a) are provided for the axle drive gears 22. In particular, lateral movement of the axle gears 22 is constrained by surfaces 44 formed on the inside of the differential case 10 and the side surfaces 40a defined by the spacer. With the spacer 26 installed as shown in FIGS. 1 and 2, axial movement of both the axle shafts 20 and the axle drive gears 22 is constrained to predetermined limits, determined by the dimensions of the spacer elements 26a, 26b and the dimensions of the locating surfaces 44 formed inside the differential case.

The principle of operation for the differential assembly disclosed in FIGS. 1 and 2 is substantially similar to the principle of operation of the "cross-axis compound planetary gear complex" disclosed in Gleasman Pat. No. 2,859,641. Like the earlier Gleasman patent, the illustrated differential utilizes a transfer gear arrangement for cross-coupling the axle drive gears 22 to provide the necessary torque differentiation. In the presently disclosed differential, the transfer gear arrangement includes a pair of spaced-apart transfer gears 50 which are rotatably coupled together by an intermediate gear arrangement, indicated generally by the reference character 54. Each transfer gear includes an irreversible gear portion 50a, preferably a worm wheel that is engaged with one of the axle drive gears 22. The associated axle drive gear includes external teeth that mate with the teeth of the worm wheel portion.

Alternatively, irreversible gear portion 50a and axle drive gears 22 may comprise cross axes helical gears. A pair of reversible gears, which in the preferred embodiment comprise spur gears 50b are disposed on either side of the worm wheel portion 50a of each transfer gear 50. As seen in the Figures, the transfer gear arrangement is mounted in an opening or "window" 56 formed in the differential case. According to a feature of the invention, the intermediate gearing 54, rotatably couples the paired transfer gears located in a given window 56 to each other. In the illustrated embodiment, the intermediate gearing 54 comprises spaced-apart spur gears 54a which are in meshing engagement with the adjacent spur gears forming part of the transfer gears.

The individual components that comprise the transfer gear arrangement, can be mounted and supported within the window 56 by various methods. In the disclosed embodiment, each transfer gear 50 is rotatably supported by a shaft 60 that extends across the window opening and is received by spaced, aligned bores 62 formed in the differential case 10. The shaft 60 is suitably secured in position by pins, set screws or other known methods. The intermediate or idler gears 54a located between the paired transfer gears 50 are fixed in position by a removable, threaded fastener 64 which threadedly engages the differential case. Alternately, the gears can be rather permanently mounted by a rivet or similar element. In addition, the idler gears can be supported in the window by a shaft (not shown), similar to the transfer gear shafts 60 which would extend across the opening. A spacer (not shown) would be needed to maintain the spaced positions of the idler gears on the shaft.

In the embodiment disclosed in FIGS. 1, 2, and 3, the idler gears must be removed in order to facilitate the removal of the split spacer 26. Depending on the final dimensions of the axle drive gears 22, and the final position of the axle ends 20, one or both transfer gears 50 from one window 56 may also have to be removed in order to remove the spacer.

Figure 5:
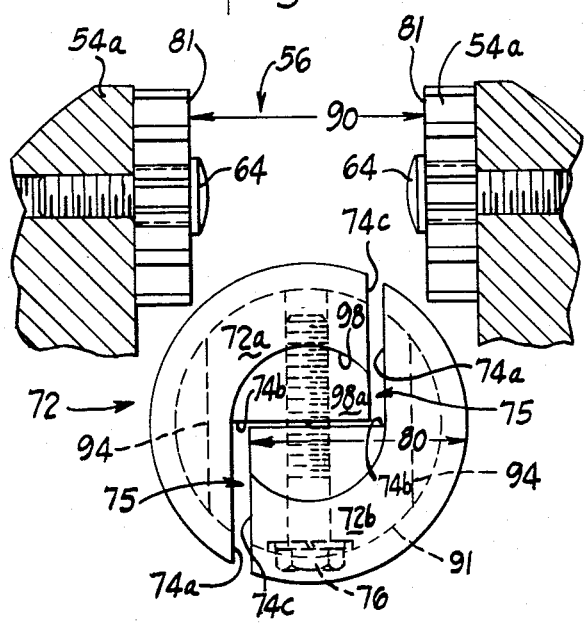

Turning now to FIGS. 4 and 5, an alternate construction is illustrated which eliminates the need for substantial disassembly of the differential in order to remove the thrust spacer arrangement. The alternate preferred embodiment differs from the earlier described embodiment in that the spacing arrangement receives only the extreme ends of the axles. The locking elements for maintaining the axle ends within the differential are received and captured by the side gears, whereas the axles are maintained in their spaced apart positions by the spacing arrangement.

Referring in particular to FIGS. 4 and 5, in the alternate embodiment, axle drive gears 22' include a splined bore which mates with the splined ends of the axle shafts 20. Unlike the axle drive gears 22, illustrated in FIGS. 1 and 2; the side gears 22' include a recess 70 concentric with the internal splined bore. The recess 70 defines a shoulder 70a against which the axle locking elements 32 seat when the axle ends are in their operative position shown in FIG. 4, thus preventing outward movement of the axle shafts 20 from the differential.

The alternate spacer block 72, like the spacer block 26, is split to facilitate removal. As seen best in FIG. 6, the alternate spacer block includes an off-set bisection as opposed to a simple diametral split arrangement of the first embodiment. As seen in this Figure, the spacer block 72 includes halves 72a, 72b held together by a suitable fastener, such as a bolt 76 that extends through the half 72b and threadedly engages the half 72a. The split line for the spacer 72 is defined by stepped confronting surfaces 74a, 74b, 74c, provided on each half of the spacer 72a, 72b. In the embodiment shown, the spacer halves abuttably engage each other along their surfaces 74b which preferably are coincident with a diametral line for the assembled spacer. The surfaces 74a, 74c of each spacer half are preferably parallel, but off-set with respect to each other and intersect the diametral surfaces 74b at 90°. In the preferred embodiment, the surfaces 74a, 74c are formed coincident with chordal lines of the assembled spacer 72 and when the halves 72a, 72b are assembled, the respective chordal surfaces 74a, 74c are placed in a confronting alignment with respect to each other; however, a clearance 75 between the surfaces is preferably provided as shown in FIG. 5. The clearance 75 facilitates removal of the spacer and allows lubrication to reach the inside of the spacer and axle ends.

In accordance with a feature of this embodiment, the transverse dimension of each half as measured between the chordal surface 74c and the outer extremity, (as indicated by the arrows 80) is selected to be less than the distance between outer end faces 81 of the idler gears as indicated by the arrow 90. With this arrangement, the individual halves of the spacer block can pass between the idler gears 54a thus enabling removal of the spacer without disassembly of the differential.

As seen in FIG. 4 and as indicated by the phantom line 91 in FIG. 5, the center of the spacing arrangement is relieved so that the axial center portion is of a smaller diameter than the outward edges, thus defining spaced flanges 92. By relieving the center portion of the spacer, and by using fasteners for the idler spur gears having relatively shallow heads as seen in FIG. 5, clearance is provided for the heads, thus enabling removal of the spacer. In a further refinement of the invention, slots indicated by the phantom line 94 can be formed to provide clearance for larger sized fastener heads.

When the spacer is installed and assembled, the joined halves define spaced apart recesses 98 that are sized to receive the extreme ends of the axle 20. Each recess 98 is defined by an end wall 98a that coacts with the end face 36 of the axle end thus forming a thrust surface for the axles. In addition, the flanges 92 formed at the axial ends of the spacer include end surfaces 92a that confrontingly engage inner end face portions 22a' of the axle drive gears 22' thus providing a thrust surface for the side gears themselves.

In summary, with the alternate embodiment of the spacing arrangement, the bisection of the spacer 72 is formed to enable removal of the individual halves 72a, 72b of the spacer through the opening defined between the idler spur gears 54a. The relieved area as well as the optional slot are formed on the individual halves in order to provide clearance for the heads of the fasteners that secure the idler gears to the differential case.

According to a feature of the invention, the disclosed transfer gear arrangement utilizing the intermediate gearing 54 operates to equalize axial end thrust in the components so that equal and opposed thrust forces are exerted on the differential case and/or the axles by the axle drive gears. In the transfer gear arrangement disclosed in U.S. Pat. No. 2,859,641 to Gleasman, the tooth inclination angles of the teeth on the side or axle drive gears were parallel. As a result, during differential operation, the reaction force between the teeth of the transfer gears and the side gears were additive producing twice the normal side loading on one axle gear. U.S. Pat. No. 4,191,071 to Gleasman et al disclosed a torque equalizer arrangement for obviating or reducing the effects of the additive thrust loading.

According to the invention, the tooth inclination angles of the side gears 22 (shown in FIGS. 1, 2 and 3) and the side gears 22' (shown in FIGS. 4 and 5) are opposed and thus any generated thrust forces on the axle drive gears are also opposed.

Referring in particular to FIG. 1, if during differentiation, the left transfer gear 50 rotates clockwise the reaction between it and its associated side gear 22 will produce an axle gear side thrust that is directed leftwardly against the inside of the differential case. The clockwise rotation of the left transfer gear will be transferred to the idler spur gear 54a and produce counterclockwise rotation in the right transfer gear 50. The counterclockwise rotation of the right transfer gear will in turn produce a reaction force between itself and its associated axle drive gear 22 that will generate a side thrust on the axle drive gear directed rightwardly, thus applying a side loading to the inside of the transfer case. Since the axle drive thrust loads are both directed to the inside of the case, in opposite directions, the net end thrust of the differential case is substantially zero.

Counterclockwise rotation, during differentiation, of the left transfer gear will direct end thrust inwardly against the spacer block. An equal but opposite force, will be exerted by the right axle drive gear thus producing a thrust force that is counter to the thrust force applied by the left axle drive gear.

The spacer block arrangements disclosed in the Figures are considered preferred embodiments because they each include surfaces that define axle as well as side gear thrust and/or spacing surfaces. In the case of the first embodiment, the end wall 31 of the recess 30 receives end thrust from the axle end 36 and the flange side surface 40a receives end thrust from the side gears 22. In the second embodiment, the end wall 98a defined by the assembled spacer accepts end thrust from the axle end faces 36 and the flange side surfaces 92a accept end thrust from the side gears 22'.

In still another alternate embodiment (not shown), the spacer arrangement can be simplified if a separate thrust surface is not needed or desired for the side gears 22'. Referring in particular to FIGS. 4 and 5, if side gears 22' are used that include the recesses 70 for receiving the locking elements 32, the spacer arrangement 72 can be replaced by a pin or other similar element that would extend between the ends of the axles (and intersect the axis of rotation) and be supported at opposite sides of the differential case. By appropriate selection of the pin diameter, the installation of the pin would prevent the inward movement of the axle ends thus maintaining the positions of the axles as shown in FIG. 4. The pin would also serve as a thrust member for the axle ends, since the end faces 36 would confrontingly engage the sides of the pin. With this arrangement, however, the thrust exerted by the side gears 22' would not be received directly by the pin. Instead, the thrust exerted by the side gears would be transferred to the pin by way of the locking elements 32 against which the side gear would bear, in the situations where inwardly directed axle side thrust is generated. In this alternate embodiment, the locking elements 32 would not only serve as a means for retaining the axle ends in the differential assembly but would also serve as a means for transferring inwardly directed thrust loading from the axle drive gears to the spacer pin.

Although not shown, this above described pin arrangement is considered encompassed by the present invention. It is considered suitable for those applications where side thrust loads from the transfer gears are small enough such that they can be borne by the axle lock elements.

In describing the present invention, reference has been made to a "rear axle housing" and "rear drive vehicles". This invention is not limited, however, to rear drive vehicles but can be adapted to either a rear or front drive arrangements as well as other applications that require differential gearing such as transfer cases and interaxles.

Although the invention has been described with a certain degree of particularity, it should be understood that various changes can be made to it by those skilled in the art without departing from the spirit or scope of the invention as hereinafter claimed.

I claim:

1. In a differential assembly of the type including a differential case having means for receiving a pair of axle ends, side gears disposed within said case and rotatably coupled to said axle ends, at least one transfer gear associated with each side gear defining a side gear engaging portion and a balancing gear portion at each end, said transfer gears being arranged in pairs such that a transfer gear associated with one side gear is paired with a transfer gear associated with the other side gear, and each transfer gear pair being rotatably mounted in a window defined by said case, an improvement in said differential assembly employing internal locking elements for retaining said axle ends within said case comprising:
   (a) a pair of axle ends, each defining an annular groove for receiving locking rings;
   (b) locking rings engaged by said grooves and abutting side surface portions of said side gears for preventing outward movement of said axle ends;
   (c) axle spacing thrust means disposed between said axle ends defining spaced thrust surfaces for said axle ends and side gears;
   (d) reversible idler gears rotatably mounted in said window and engaging said balancing gear portions for rotatably coupling respective transfer gears of said transfer gear pair, said reversible idler gears operating to balance end thrust between said side gears and said reversible idler gears defining a clearance opening within said window of sufficient expanse to allow removal of said axle spacing thrust means and in turn said locking rings.

2. The differential gear assembly of claim 1, wherein each transfer gear comprises a worm wheel portion and spur gear portion disposed at each end of said worm wheel portion.

3. The gear assembly of claim 2, wherein said intermediate gear means comprises spur gears which coengage the spur gear portions of said paired transfer gears.

4. The gear assembly of claim 1, wherein said axle spacing means comprises a bifurcated member maintained in an assembled position by a fastening means.

5. The gear assembly of claim 3, wherein said intermediate spur gears for coupling paired transfer gears rotate about substantially coincident axes, said intermediate gears being spaced apart on either side of an opening defined by said case such that a clearance region between said intermediate spur gears is defined having an expanse sufficient enough to enable the removal of said axle spacing means from within said differential case member.

6. A spacer and thrust arrangement for maintaining a spaced apart relationship between a pair of axle ends secured to a differential assembly by locking elements that engage locking structure formed near the ends of the axle ends, said arrangement comprising:
   a spacer defined by two similar elements joined together by a fastener, said joined elements defining spaced apart, aligned recesses for receiving the ends of said axles, each recess defining an end wall abuttably engageable by an end face of an associated axle, the axial distance between the end walls of said recesses defining a predetermined spaced apart distance for said axle ends, said spacer further defining spaced side thrust surfaces for axle drive gears positioned within said differential assembly, wherein said individual elements are defined by a split line that includes offset chordal and diametral surfaces that are placed in confronting alignment when said elements are joined together.

7. The spacer and thrust arrangement of claim 6 wherein said confronting chordal surfaces of said jointed elements define an opening between said elements.

* * * * *

UNITED STATES PATENT OFFICE
CERTIFICATE OF CORRECTION

PATENT NO. : 4,495,835
DATED : January 29, 1985
INVENTOR(S) : Vernon E. Gleasman It is certified that error appears in the above-identified patent and that said Letters Patent are hereby corrected as shown below:

In Column 1, line 7, delete "475,525" and substitute --475,528--;

In Column 1, line 11, delete "475,528" and substitute --475,525--.

Signed and Sealed this

Eleventh Day of June 1985

[SEAL]

Attest:

DONALD J. QUIGG

Attesting Officer　　Acting Commissioner of Patents and Trademarks